United States Patent
Terner

[15] 3,698,586
[45] Oct. 17, 1972

[54] PLASTIC ENCASED GLASS CONTAINER

[72] Inventor: E. M. Terner, Oakhurst, N.J.

[73] Assignee: Midland Glass Company, Inc., Cliffwood, N.J.

[22] Filed: Sept. 2, 1970

[21] Appl. No.: 68,931

[52] U.S. Cl. ............... 215/12 R, 156/86, 215/DIG. 6
[51] Int. Cl. ............................................. B64d 23/08
[58] Field of Search ........ 215/12 R, DIG. 6, 1 R, 1 C, 215/38 A, 32; 229/DIG. 12; 156/86

[56] References Cited

UNITED STATES PATENTS

| | | | |
|---|---|---|---|
| 2,035,384 | 3/1936 | Hinchliff | 215/12 R X |
| 3,604,584 | 9/1971 | Shank | 215/12 R |
| 3,372,826 | 3/1968 | Heaton | 215/12 R |
| 2,565,954 | 8/1951 | Dey | 215/12 R |
| 3,178,049 | 4/1965 | Cottet | 215/DIG. 6 |
| 1,969,453 | 8/1934 | Churchill | 215/38 A |
| 3,057,472 | 10/1962 | Douty | 229/DIG. 12 |
| 3,542,229 | 11/1970 | Beyerlein et al. | 215/12 R |
| 3,480,168 | 11/1969 | Lee | 215/12 R |
| 3,223,571 | 12/1965 | Straughan | 156/86 |

FOREIGN PATENTS OR APPLICATIONS

| | | | |
|---|---|---|---|
| 1,300,857 | 7/1962 | France | 215/12 R |
| 468,762 | 7/1937 | Great Britain | 215/38 A |

Primary Examiner—Donald F. Norton
Attorney—Kane, Dalsimer, Kane, Sullivan & Kurucz

[57] ABSTRACT

A glass container, such as a bottle, is encased in a plastic film in order to preserve the inherent strength of the glass. The film may be formed as a shrinkable sheath into which the container is placed, followed by heating, or a portion of the encasing material may be in the form of such a sheath, with the remainder of the film applied by a wrapping operation.

2 Claims, 5 Drawing Figures

INVENTOR
E. M. TERNER
BY
Kane, Dalsimer, Kane, Sullivan & Kurucz
ATTORNEYS

PLASTIC ENCASED GLASS CONTAINER

BACKGROUND OF THE INVENTION

The art of glass container manufacture, such as the manufacture of glass bottles, is an old one. At room temperature, glass is known to be hard, but brittle. The inherent strength of glass is extremely high. However, because of the brittleness, glass is often subject to breakage though the force applied would not be sufficient to fracture the glass, but for its brittleness, in view of the high strength properties.

Various means have been employed in an attempt to correct the brittleness problem and take advantage of the high inherent strength. Some of these techniques involve chemical treatments and are both sophisticated and expensive. In some cases, the glass has been tempered or has been treated, on the surface, with sulfur dioxide. Ion exchange has also been employed to increase strength. However, such techniques are not applicable to the manufacture of relatively inexpensive glass containers, such as glass bottles.

The prior art has suggested the treatment of glass containers through coating with a plastic in order to take advantage of the inherent strength of the glass. However, spray application of plastic has resulted in an uneven coating and in an excess of plastic in areas where undue thickness is not desirable. As a result, such treatment has not proved economical, even in those situations where it has acted to improve the strength of the glass.

SUMMARY OF THE INVENTION

In accordance with the present invention, it has unexpectedly been determined that a glass container, such as a bottle, can be encased in plastic, employing films, to protect the inherent strength of the glass. The use of the film provides for protection of the container at those points where protection is desired, or over the entire bottle, should that be desired, with a uniform application of the plastic. As previously indicated, this uniformity of application with the resultant increase in strength was not possible when the plastic was sprayed on, a method previously employed.

Several methods can be used to cover the container with the desired plastic film. A preferred method of accomplishing the covering of a glass container is through the use of a drawn or molded cup of a plastic material into which the bottom of the container is placed. This cup should be formed of a material which, upon heating, shrinks about the glass so as to tightly cover it. If it is desired to protect the top shoulder of a bottle, a second cup can be similarly formed, this second cup being provided with an opening through which the neck of the bottle is fitted. This will provide protection for the container at the points where it is most likely to be damaged through contact, particularly contact with other bottles.

If it is also desired to protect the central portion of the container, that portion between the bottom and the shoulder, a plastic film or tape can be wrapped around the container to cover the areas between the cup placed at the bottom of the container and the cup placed over the shoulder. It is desirable that such a plastic film be sealable, both to itself and to the cup members, through the application of heat.

Still further, the entire bottle may be encased in a plastic sleeve, particularly a sleeve formed of a material which shrinks upon the application of heat, so as to tightly encase the bottle. When the entire bottle is encased, either by this method or by the method previously described, the inherent strength of the glass is not only preserved, but, additionally, a sleeve is provided which will contain any glass chips or fragments which result should the glass of the container be broken, notwithstanding the additional protection.

It is an object of the present invention to provide a glass container having at least a partial plastic film coating so as to take advantage of the inherent strength of the glass.

DETAILED DESCRIPTION OF THE INVENTION

Figure 1:
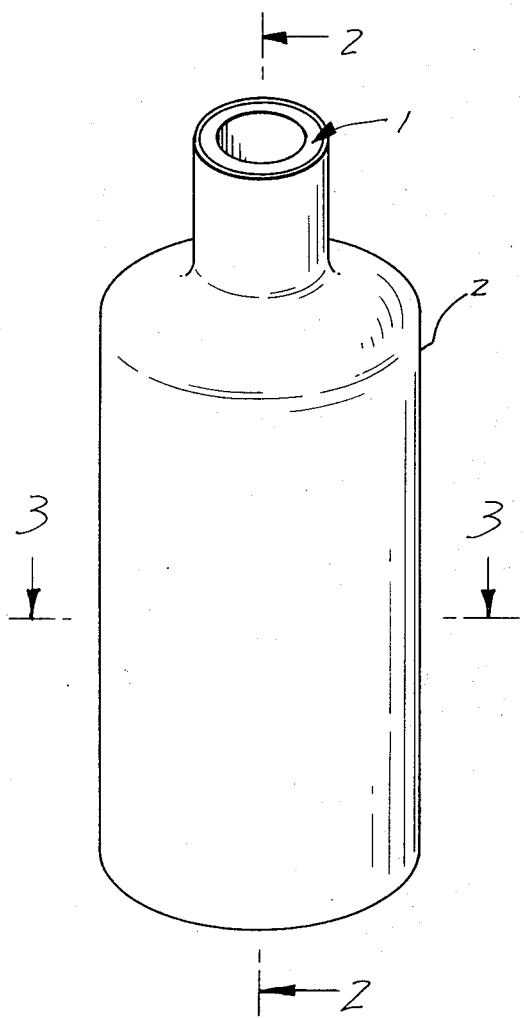
FIG. 1 is a perspective view of a bottle entirely encased in a plastic film.

Referring to the drawings, a glass container in the form of a bottle 1 is shown in FIG. 1. This bottle is completely encased in a plastic film 2. In particular, the film is formed of a material such as polyethylene terephthalate which, upon the application of heat, will shrink in order to be tightly fitted to the surface of the container. According to the present invention, this film may be formed in one, or more preferably two, pieces, applied to the bottle, and the bottle subjected to a mild heat treatment in order to reorient the polyethylene terephthalate and cause it to shrink about the bottle. Other materials which can be employed in place of the polyethylene terephthalate are, for example, irradiated polyethylene and heat-shrinkable polyvinylchloride. This list is not meant to be exhaustive of the materials which may be employed in this use.

Figure 2:
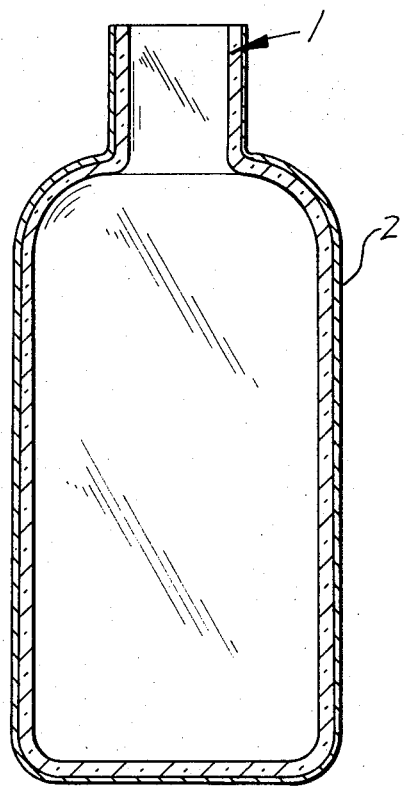
FIG. 2 is a sectional view along the line 2—2 of FIG. 1.
Figure 3:
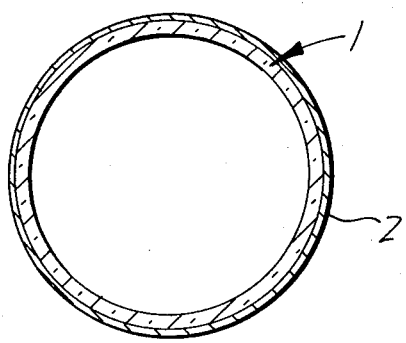
FIG. 3 is a sectional view along the lines 3—3 of FIG. 1.
Figure 4:
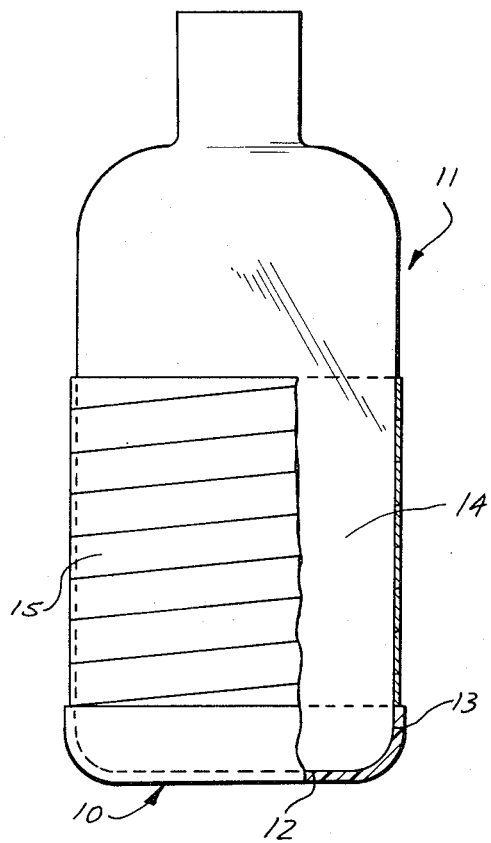
FIG. 4 is an elevational view, partially broken away, of a bottle, the bottom of which is encased in a plastic film applied in the form of a cup, with the central section of the bottle being wrapped with a plastic film.
Figure 5:
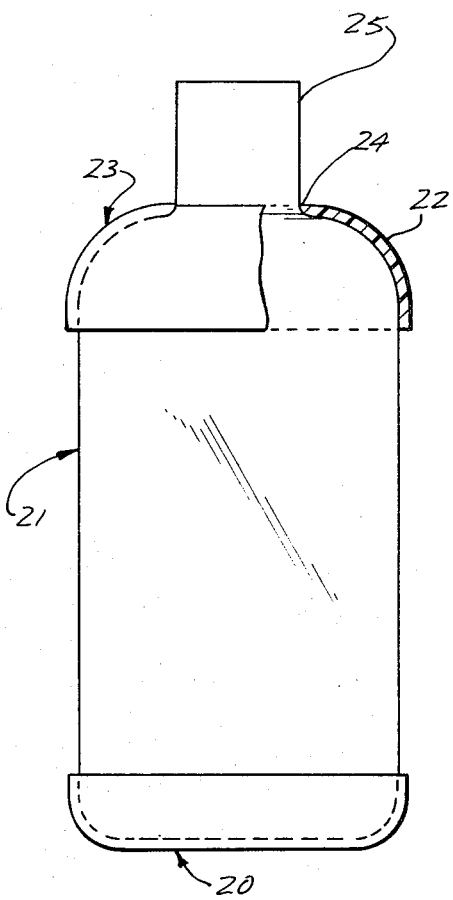
FIG. 5 is an elevational view, partially broken away, of a bottle, the bottom and shoulder of which are encased in plastic films applied as preformed cups.

The glass containers having an applied film of a plastic material illustrated in FIGS. 4 and 5 are a preferred embodiment of the present invention. In accordance with that embodiment, as seen particularly in FIG. 4, a cup 10 formed of heat-shrinkable plastic is applied about the bottom of a glass container 11, in the form of a bottle. This cup-shaped member 10 covers the entire bottom 12 of the container and from about ½ to 1 inch of that portion of the side 13 of the container adjacent the base. The container is placed into this cup 10, which may be formed of the same materials previously described with respect to FIG. 1 through 3, i.e., oriented polyethylene terephthalate, irradiated polyethylene, or heat-shrinkable polyvinylchloride. Heat is then applied so as to cause the cup-shaped member to shrink and tightly encase that portion of the container to which it is applied.

Either before or after the heating operation, a plastic film may be applied to the central portion 14 of the container. While a heat-shrinkable plastic sleeve may be employed, the film may also be applied to the central section as by helically winding a tape 15 so as to cover that portion of the container from the cup 10 to the level to which coverage is desired. Obviously, this tape may also be wound in other manners.

Preferably, the tape is of a material which, upon heating, will flow and bond to adjacent layers. For example, polyethylene may be employed as the material of which the tape is formed.

In Fig. 5 a cup 20, which may be identical to the cup 10 illustrated in FIG. 4, is applied to the bottom portion of the container 21. In order to protect the shoulder 22 of the container, a second cup 23 is applied. The cup 23 is provided with an opening 24 through which the neck 25 of the bottle illustrated may pass. The cup 23 is also formed of a heat-shrinkable plastic material and may be shrunk so as to tightly encase the shoulder of the bottle at the same time that the cup 20 placed at the bottom is shrunk about that portion of the container. While the cup 23 is illustrated as merely covering the shoulder portion of the bottle, it should be appreciated that it may be extended so as to also encase the entire neck 25.

While the container of FIG. 4 has been illustrated as being encased in plastic only at the bottom and along the central portion, and while the bottle of FIG. 5 has been illustrated as encased only in a bottom cup and a top cup member, it should be appreciated that these two illustrations may be combined. Thus, a bottle may be totally encased in plastic by applying a cup-shaped member such as cup 10 or 20 to the bottom, a second cup-shaped member, such as cup 23 to the shoulder, and covering the area of the bottle between these two cups with a wrapping of a plastic, such as the wrapping 15. The neck of the bottle, should it be desired to encase this portion also, may be covered either by a tape, in the same manner as the tape 15 was applied, or may be enclosed by extending cup member 23 so as to also enclose the neck.

When a glass container is encased as illustrated in FIG. 1, or through a combination of the means illustrated in FIGS. 4 and 5, not only is the entire structure of the container protected so as to preserve its inherent strength, but, additionally, an envelope is provided so as to secure any glass particles which may result should the container break, notwithstanding the application of the protective material. The containers of FIGS. 4 and 5, on the other hand, while not providing the envelope effect, have a protective coating applied in those areas where containers, such as glass bottles, are known to experience the most frequent shocks, resulting in their breakage. The plastic cushioning provides a protective layer to preserve the inherent strength of the glass in a manner not possible with a plastic applied by spray coating.

The invention has been described in detail with particular reference made to preferred embodiments thereof, but it will be understood that variations and modifications can be effected within the spirit and scope of the invention as described hereinabove and as defined in the appended claims.

I claim:

1. In a glass bottle having a bottom section, a shoulder, a central section connecting said bottom and said shoulder, and a neck extending from said shoulder, the improvement which comprises the bottom and shoulder of the bottle encased in plastic films wherein each such film is a separate, heat-shrunk, plastic cup-shaped member.

2. In a glass bottle having a bottom section, a shoulder, a central section connecting said bottom and said shoulder, and a neck extending from said shoulder, the improvement which comprises the entire outer surface of the bottle encased in a plastic film wherein the film encasing the bottom and shoulder comprise separate, heat-shrunk, plastic, cup-shaped members.

* * * * *